US010239273B2

(12) United States Patent
Bao et al.

(10) Patent No.: US 10,239,273 B2
(45) Date of Patent: Mar. 26, 2019

(54) THERMAL INSULATION LAYER AND PRESSURE TRANSFER MEDIUM FOR HIGH-PRESSURE HIGH-TEMPERATURE CELL

(71) Applicant: Smith International, Inc., Houston, TX (US)

(72) Inventors: Yahua Bao, Orem, UT (US); J. Daniel Belnap, Lincoln, UT (US); Stewart N. Middlemiss, Salt Lake City, UT (US)

(73) Assignee: SMITH INTERNATIONAL, INC., Houston, TX (US)

( * ) Notice: Subject to any disclaimer, the term of this patent is extended or adjusted under 35 U.S.C. 154(b) by 0 days.

(21) Appl. No.: 15/899,735

(22) Filed: Feb. 20, 2018

(65) Prior Publication Data

US 2018/0169987 A1 Jun. 21, 2018

Related U.S. Application Data

(62) Division of application No. 13/830,181, filed on Mar. 14, 2013, now abandoned.

(60) Provisional application No. 61/621,918, filed on Apr. 9, 2012.

(51) Int. Cl.
| B30B 11/00 | (2006.01) |
| B30B 15/00 | (2006.01) |
| B01J 3/06 | (2006.01) |

(52) U.S. Cl.
CPC ............. B30B 11/004 (2013.01); B01J 3/065 (2013.01); B01J 3/067 (2013.01); B30B 15/00 (2013.01)

(58) Field of Classification Search
CPC ........ B30B 11/004; B30B 15/00; B01J 3/065; B01J 3/067
See application file for complete search history.

(56) References Cited

U.S. PATENT DOCUMENTS

| 2,918,699 | A | | 12/1959 | Hall |
| 2,941,241 | A | | 6/1960 | Strong |
| 2,941,248 | A | | 6/1960 | Hall |
| 3,030,662 | A | | 4/1962 | Strong |
| 3,067,465 | A | * | 12/1962 | Giardini .................. B01J 3/067 |
| | | | | 100/99 |
| 3,407,445 | A | | 10/1968 | Strong |
| 3,436,182 | A | | 4/1969 | Inuzuka |
| 3,647,331 | A | | 3/1972 | Kuratomi |
| 3,806,471 | A | | 4/1974 | Mitchell |
| 4,097,208 | A | | 6/1978 | Ishizuka |
| 4,103,100 | A | | 7/1978 | Kabayama et al. |
| 4,118,161 | A | * | 10/1978 | Kennedy .................. B01J 3/06 |
| | | | | 423/446 |
| 5,122,043 | A | * | 6/1992 | Matthews ................ B01J 3/006 |
| | | | | 425/174.6 |
| 5,190,734 | A | | 3/1993 | Frushour |
| 5,552,039 | A | | 9/1996 | McBrayer, Jr. et al. |
| 5,796,107 | A | | 8/1998 | Buchtemann et al. |
| 5,858,525 | A | | 1/1999 | Carter et al. |
| 8,057,597 | B2 | | 11/2011 | Martin Parrondo et al. |
| 8,394,729 | B2 | | 3/2013 | Malik |
| 2004/0134415 | A1 | * | 7/2004 | D'Evelyn ................ B01J 3/062 |
| | | | | 117/84 |
| 2006/0159436 | A1 | | 7/2006 | Yuasa et al. |
| 2008/0193579 | A1 | | 8/2008 | Hall et al. |
| 2009/0272416 | A1 | | 11/2009 | Malik |
| 2010/0079842 | A1 | | 4/2010 | Dunleavy et al. |
| 2011/0020081 | A1 | | 1/2011 | Webb et al. |
| 2012/0312227 | A1 | | 12/2012 | Zhu et al. |
| 2013/0160700 | A1 | | 6/2013 | Kim et al. |

FOREIGN PATENT DOCUMENTS

| CN | 101161867 A | 4/2008 |
| CN | 102989373 A | 3/2013 |
| EP | 0816526 A2 | 1/1998 |
| JP | H11222603 A | 8/1999 |
| JP | 2005058836 A | 3/2005 |
| KR | 10-2004-0042576 A | 5/2004 |
| WO | 01/72405 A1 | 10/2001 |
| WO | 02/24603 A1 | 3/2002 |
| WO | 2005067530 A2 | 7/2005 |

OTHER PUBLICATIONS

International Search Report and Written Opinion of PCT Application No. PCT/US2013/035549 dated Jul. 15, 2013. 13 pages.
International Preliminary Report on Patentability issued in PCT Application No. PCT/US2013/035549 dated Oct. 23, 2014. 10 pages.
International Search Report and Written Opinion of PCT Application No. PCT/US2013/035543 dated Jul. 9, 2013. 10 pages.
International Preliminary Report on Patentability issued in PCT Application No. PCT/US2013/035543 dated Oct. 23, 2014. 7 pages.
First Office Action and Search Report issued in Chinese Patent Application 201380016571.8 dated Sep. 21, 2015. 26 pages.
Second Office Action issued in Chinese Patent Application 201380016571.8 dated May 23, 2016. 15 pages.
Decision of Rejection issued in Chinese patent application 201380016571.8 dated Jan. 9, 2017. 20 pages.
Re-examination issued in Chinese patent application 201380016571.8 dated Nov. 30, 2017. 11 pages.
First Office Action and Search Report issued in Chinese Patent Application 201380019095.5 dated Nov. 4, 2015. 13 pages.
Second Office Action issued in Chinese Patent Application 201380019095.5 dated Jun. 8, 2016. 6 pages.
Third Office Action and Search Report issued in Chinese Patent Application 201380019095.5 dated Dec. 2, 2016. 14 pages.
Fourth Office Action and Search Report issued in Chinese Patent Application 201380019095.5 dated Jun. 1, 2017. 13 pages.

(Continued)

*Primary Examiner* — Nahida Sultana

(57) ABSTRACT

HPHT press system includes a thermal insulation layer. The thermal insulation layer includes CsCl, CsBr, CsI, or a combination thereof, and the thermal insulation layer is electrically insulating. The thermal insulation layer may include a thermal insulation sleeve and/or a thermal insulation button for an HPHT cell.

19 Claims, 5 Drawing Sheets

(56) References Cited

OTHER PUBLICATIONS

Search Report R.62 issued in European Patent Application 13775180.6 dated Nov. 23, 2015. 3 pages.
Examination Report 94(3) issued in European Patent Application 13775180.6 dated Dec. 8, 2015. 6 pages.
Examination Report 94(3) issued in European Patent Application 13775180.6 dated Jul. 20 2016. 6 pages.
Partial Search Report R. 164(1) issued in European Patent Application 13775094.9 dated Nov. 27, 2015. 6 pages.
Search Report R.61 pr R. 63 issued in European Patent Application 13775094.9 dated Apr. 28, 2016. 5 pages.
Examination Report 94(3) issued in European Patent Application 13775094.9 dated May 30 2016. 7 pages.
Office Action issued in Japanese patent application 2015-505819 dated Sep. 28, 2016. 3 pages.
Osipov et al., "Rapid sintering of nano-diamond compacts", Diamond & Related Materials 19(2009), pp. 1061-1064.
Palyanov et al., "The effect of composition of mantle fluids/melts on diamond formation processes", Lithos 112S (2009) pp. 690-700.
Walker, "Lubrication, gasketing, and precision in multianvil experiments", American Mineralogist, vol. 76, pp. 1092-1100, 1991.
Bhaumic, "A modified high-temperature cell (up to 3300K) for use with a cubic press", Rev. Sci. Instrum., 67 (10), Oct. 1996.
Wen-Dan et al., "Research on pressure generation efficiency of 6-8 type multianvil high pressure apparatus", ACTA Physica Sinica 59 (5), May 2010, pp. 3107-3115. Includes English Abstract.
Shatskiy et al., "High pressure generation using scaled-up Kawai-cell", Physics of the Earth and Planetary Interiors., vol. 189, 2011, pp. 92-108.
Frost, "A new large-volume multi anvil system", Physics of the Earth and Planetary Interiors, vol. 143, issue 1-2, pp. 507-514, 2004.
Office Action Issued in U.S. Appl. No. 13/836,396 dated Feb. 26, 2016. 8 pages.

* cited by examiner

THERMAL INSULATION LAYER AND PRESSURE TRANSFER MEDIUM FOR HIGH-PRESSURE HIGH-TEMPERATURE CELL

CROSS-REFERENCE TO RELATED APPLICATIONS

This application is a divisional of U.S. patent application Ser. No. 13/830,181, filed on Mar. 14, 2013, which claims priority to and the benefit of U.S. Provisional Patent Application No. 61/621,918 filed Apr. 9, 2012, the entire contents of both of which are incorporated herein by reference.

BACKGROUND

High-pressure high-temperature (HPHT) cells are used to form ultra-hard materials such as polycrystalline diamond (PCD) and polycrystalline cubic boron nitride (PCBN), which in turn are used in tools such as cutting tools and rock drilling tools. HPHT cells are used in HPHT presses such as, cubic presses, belt presses, and toroid presses. To form ultra-hard materials, HPHT presses often apply pressures in the range of 5 to 8 GPa and temperatures in the range of 1300 to 1650° C. For example, PCD may be sintered at 5 to 7 GPa and 1400 to 1500° C.

The formation of certain ultra-hard materials, such as thermally stable PCD, involves sintering at much higher temperatures. In particular, PCD formed using a carbonate catalyst may be sintered at a pressure greater than 6.5 GPa and a temperature greater than 2000° C. Additionally, binderless nano-polycrystalline PCD may be sintered at a pressure of about 15 GPa and a temperature of about 2300° C.

Sintering at these temperatures may be carried out using an HPHT cell including refractory materials that can withstand the high temperatures attained within the cell. For example, materials such as magnesium oxide (MgO) and sodium chloride (NaCl) have been used as pressure transfer media, and cubic zirconium oxide ($ZrO_2$) having low thermal conductivity has been used as a thermal insulation sleeve in an HPHT cell. However, at pressures of about 8 GPa, NaCl begins to melt when the temperature exceeds 1600° C.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

Aspects of embodiments of the disclosed subject matter are directed to a thermal insulation layer for use in a high-pressure high-temperature press, the thermal insulation layer including a material including cesium chloride (CsCl), cesium bromide (CsBr), cesium iodide (CsI) or a combination thereof, and the thermal insulation layer being electrically insulating.

In certain embodiments, the thermal insulation layer is a thermal insulation sleeve or thermal insulation button.

In certain embodiments, the thermal insulation layer has an electrical resistivity of more than about 0.1 ohm·cm.

The thermal insulation layer may further include an additive.

The additive may reflect and/or absorb thermal radiation.

The additive may be a liquid at high-pressure high-temperature conditions.

The additive may include electrically conductive or semiconductive particles.

In certain embodiments the additive includes a material including a chromite, a ferrite, a metal, a semiconductor, a superconductive oxide or a combination thereof.

The additive may include chromite according to the formulas $LCrO_3$ or $M^I Cr_2 O_4$, wherein L is yttrium or a rare earth element, and $M^I$ is a transition metal, Mg or Li.

Chromite may be $LaCrO_3$, $FeCr_2O_4$, $CoCr_2O_4$, $MgCr_2O_4$ or a combination thereof.

Chromite may be doped with Mg, Ca, Sr or a combination thereof.

In certain embodiments, the additive includes ferrite according to the formula $M^{II}Fe_2O_4$ or $M^{III}Fe_{12}O_{19}$, wherein $M^{II}$ is a transition metal, Mg or Li, and $M^{III}$ is Ba, Sr, or a combination thereof.

Ferrite may be $Fe_3O_4$, $CoFe_2O_4$, $ZnFe_2O_4$, $BaFe_{12}O_{19}$, $SrFe_{12}O_{19}$, $Mn_aZn_{(1-a)}Fe_2O_4$, $Ni_aZn_{(1-a)}Fe_2O_4$, or a combination thereof, wherein a is in a range of 0.01 to 0.99.

In certain embodiments, the metal is a refractory metal such as Ti, V, Cr, Zr, Nb, Mo, Ru, Rh, Hf, Ta, W, Re, Os, Ir, Pt, or a combination thereof, or a metal having a relatively lower melting point, such as Bi, Sn, Pb or a combination thereof.

In other embodiments, the metal is Al, Fe, Mn, Ni, Co, Cu, B, Si, Be, Mg, Ca, Sr, Ba, Ga, In, Pb, Bi or a combination thereof.

In certain embodiments, the additive includes electrically insulating particles.

The additive may include $ZrO_2$, MgO, CaO, $Al_2O_3$, $Cr_2O_3$, an aluminate or a combination thereof.

In certain embodiments, the additive is present in the thermal insulation layer in an amount in a range of about 0.1 to about 50 volume percent based on the total volume of the insulation layer.

In other embodiments, the additive is present in the thermal insulation sleeve in an amount of less than 5 volume percent based on the total volume of the thermal insulation sleeve.

Aspects of embodiments of the present disclosure are also directed to a high-pressure high-temperature press system, the high-pressure high-temperature press system including: at least one anvil; a heating element; a current path for electrically connecting the at least one anvil and the heating element; and a thermal insulation layer including a material including cesium chloride (CsCl), cesium bromide (CsBr), cesium iodide (CsI) or a combination thereof, and the thermal insulation layer being electrically insulating.

In certain embodiments of the high-pressure high-temperature press system, the thermal insulation layer is separated from the anvil by a material that is different from the material of the thermal insulation layer.

In certain embodiments of the high-pressure high-temperature press system, the thermal insulation layer is separate from the current path.

In certain embodiments of the high-pressure high-temperature press system, the thermal insulation layer is a thermal insulation sleeve or thermal insulation button, and the thermal insulation sleeve or thermal insulation button is separated from the anvil by a material that is different from the material of the thermal insulation sleeve or thermal insulation button.

In certain embodiments of the high-pressure high-temperature press system, the thermal insulation layer has an electrical resistivity of more than about 0.1 ohm·cm.

Aspects of embodiments of the present disclosure are also directed to a pressure transfer medium for use in a high-pressure high-temperature press, the pressure transfer medium including cesium bromide (CsBr), cesium iodide (CsI) or a combination thereof.

In certain embodiments, the CsBr or CsI has a CsCl crystal structure.

The pressure transfer medium may further include an additive.

The additive may be a liquid at high-pressure high-temperature conditions.

The additive may reflect and/or absorb thermal radiation.

The additive may include electrically conductive or semiconductive particles. For example, the additive may include conductive oxide (e.g., superconductive oxides, such as, $La_{1.85}Ba_{0.15}CuO_4$, $HgBa_2Ca_2Cu_3O_x$, $Bi_2Sr_2Ca_2Cu_3O_{10}$, $YBa_2Cu_3O_7$, semi-conductors, such as Si, Ge and/or Sb, semiconductive carbides and/or nitrides (e.g., SiC, TiC and GaN).

In certain embodiments the additive includes a material including a chromite, a ferrite, a metal, a semiconductor, a superconductive oxide or a combination thereof.

The additive may include chromite according to the formulas $LCrO_3$ or $M^{I}Cr_2O_4$, wherein L is yttrium or a rare earth element, and $M^{I}$ is a transition metal, Mg or Li.

Chromite may be $LaCrO_3$, $FeCr_2O_4$, $CoCr_2O_4$, $MgCr_2O_4$ or a combination thereof.

Chromite may be doped with Mg, Ca, Sr or a combination thereof.

In certain embodiments, the additive includes ferrite according to the formula $M^{II}Fe_2O_4$ or $M^{III}Fe_{12}O_{19}$, wherein $M^{II}$ is a transition metal, Mg or Li, and $M^{III}$ is Ba, Sr, or a combination thereof.

Ferrite may be $Fe_3O_4$, $CoFe_2O_4$, $ZnFe_2O_4$, $BaFe_{12}O_{19}$, $SrFe_{12}O_{19}$, $Mn_aZn_{(1-a)}Fe_2O_4$, $Ni_aZn_{(1-a)}Fe_2O_4$, or a combination thereof, wherein a is in a range of 0.01 to 0.99.

In certain embodiments, the metal is a refractory metal such as Ti, V, Cr, Zr, Nb, Mo, Ru, Rh, Hf, Ta, W, Re, Os, Ir, Pt, or a combination thereof, or a metal having a relatively lower melting point, such as Bi, Sn, Pb or a combination thereof.

In other embodiments, the metal is Al, Fe, Mn, Ni, Co, Cu, B, Si, Be, Mg, Ca, Sr, Ba, Ga, In, Sn, Pb, Bi or a combination thereof.

In certain embodiments, the additive includes electrically insulating particles.

The additive may include $ZrO_2$, MgO, CaO, $Al_2O_3$, $Cr_2O_3$, an aluminate or a combination thereof.

The additive may be present in the pressure transfer medium in an amount in a range of about 0.01 to about 50 volume percent based on the total volume of the pressure transfer medium.

In certain embodiments, a high-pressure high-temperature press system includes the pressure transfer medium according to any of the above.

Aspects of embodiments of the present disclosure are also directed to a pressure transfer medium for use in a high-pressure high-temperature press, the pressure transfer medium including cesium chloride (CsCl) and an additive, with the proviso that the additive does not include $ZrO_2$.

The additive may reflect and/or absorb thermal radiation.

The additive may be a liquid at high-pressure high-temperature conditions.

The additive may include electrically conductive or semiconductive particles.

In certain embodiments the additive includes a material including a chromite, a ferrite, a metal, a semiconductor, a superconductive oxide or a combination thereof.

The additive may include chromite according to the formulas $LCrO_3$ or $M^{I}Cr_2O_4$, wherein L is yttrium or a rare earth element, and $M^{I}$ is a transition metal, Mg or Li.

Chromite may be $LaCrO_3$, $FeCr_2O_4$, $CoCr_2O_4$, $MgCr_2O_4$ or a combination thereof.

Chromite may be doped with Mg, Ca, Sr or a combination thereof.

In certain embodiments, the additive includes ferrite according to the formula $M^{II}Fe_2O_4$ or $M^{III}Fe_{12}O_{19}$, wherein $M^{II}$ is a transition metal, Mg or Li, and $M^{III}$ is Ba, Sr, or a combination thereof.

Ferrite may be $Fe_3O_4$, $CoFe_2O_4$, $ZnFe_2O_4$, $BaFe_{12}O_{19}$, $SrFe_{12}O_{19}$, $Mn_aZn_{(1-a)}Fe_2O_4$, $Ni_aZn_{(1-a)}Fe_2O_4$, or a combination thereof, wherein a is in a range of 0.01 to 0.99.

In certain embodiments, the metal is a refractory metal such as Ti, V, Cr, Zr, Nb, Mo, Ru, Rh, Hf, Ta, W, Re, Os, Ir, Pt, or a combination thereof, or a metal having a relatively lower melting point, such as Bi, Sn, Pb or a combination thereof.

In other embodiments, the metal is Al, Fe, Mn, Ni, Co, Cu, B, Si, Be, Mg, Ca, Sr, Ba, Ga, In, Sn, Pb, Bi or a combination thereof.

In certain embodiments, the additive includes electrically insulating particles.

The additive may include $ZrO_2$, MgO, CaO, $Al_2O_3$, $Cr_2O_3$, an aluminate or a combination thereof.

The additive may be present in the pressure transfer medium in an amount in a range of about 0.01 to about 50 volume percent based on the total volume of the pressure transfer medium.

In certain embodiments, a high-pressure high-temperature press system includes the pressure transfer medium according to any of the above.

BRIEF DESCRIPTION OF THE DRAWINGS

The accompanying drawings, together with the specification, illustrate embodiments of the present disclosure, and, together with the description, serve to explain the principles of the disclosure.

DETAILED DESCRIPTION

Figure 1:
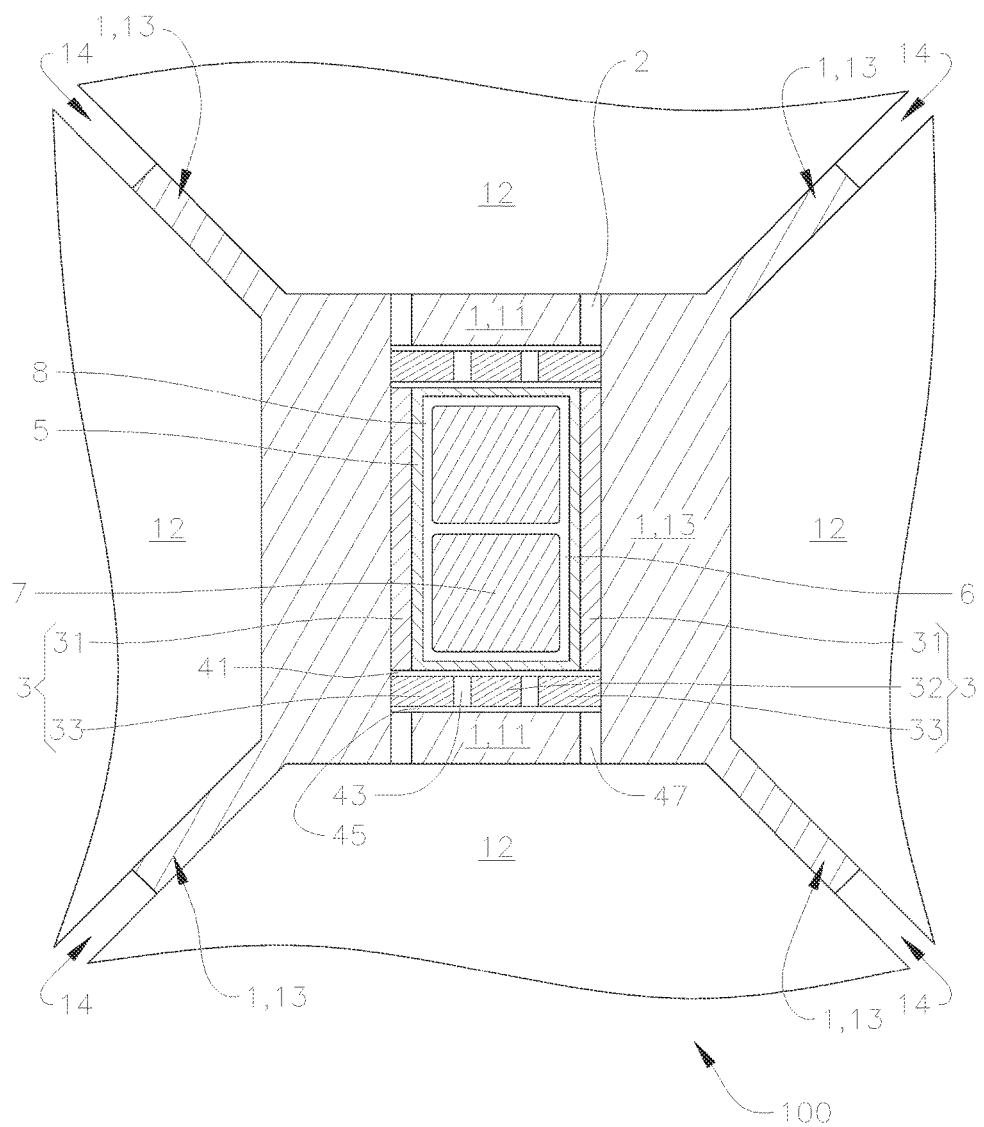
FIG. 1 is a schematic cross-sectional view of an embodiment of a high-pressure high-temperature cell of a high-pressure high temperature press.

Embodiments of the present disclosure relate to a high-pressure high-temperature (HPHT) cell including at least one of cesium chloride (CsCl), cesium bromide (CsBr) or cesium iodide (CsI). More specifically, embodiments of the present disclosure relate to a thermal insulation layer for an HPHT cell, the thermal insulation layer including CsCl, CsBr or CsI. The thermal insulation layer may be a thermal insulation sleeve, a thermal insulation button, any other insulation feature, or the thermal insulation layer may be a combination of any of the foregoing. Additionally, embodiments of the present disclosure relate to a pressure transfer medium for an HPHT cell, the pressure transfer medium including CsBr or CsI. Embodiments of the present disclosure also relate to a pressure transfer medium for an HPHT cell, the pressure transfer medium including CsCl and an additive, with the proviso that the additive does not include $ZrO_2$. Moreover, embodiments of the present disclosure are directed to HPHT press systems that include a thermal insulation layer or a pressure transfer medium according to any of the above.

Embodiments of the present disclosure will now be described with reference to the accompanying drawings, in which embodiments of the disclosure are shown. The drawings are illustrative in nature and are not to be construed as limiting the present disclosure. In the drawings, the thickness of layers and regions may be exaggerated for ease of illustration.

An embodiment of an HPHT cell for a cubic press at pressure is shown in FIG. 1. The HPHT cell 100 shown in FIG. 1 can be used in HPHT presses used for making ultra-hard materials, such as polycrystalline diamond (PCD) and polycrystalline cubic boron nitride (PCBN), or processing such ultra-hard materials into polycrystalline composites. HPHT presses are well described in patents and literature and are in use by several makers of polycrystalline ultra-hard materials. Embodiments of the HPHT cell can be used with multianvil cells, such as those described in Walker, David, *Lubrication, gasketing, and precision in multianvil experiments*, American Mineralogist, Vol. 76, 1092-1100 (1991); Shatskiy, T., et al., *High pressure generation using scaled-up Kawai-cell*, Physics of the Earth and Planetary Interiors, (Aug. 11, 2011); Frost, *A new large-volume multianvil system*, Physics of the Earth and Planetary Interiors, Vol. 143, Issue 1-2, 507-514 (2004); and Appendix 1 of U.S. Provisional Application Ser. No. 61/621,918, the entire contents of each of which are herein incorporated by reference. In particular embodiments, the HPHT cell can be used in a uniaxial multianvil press in which load is transmitted to six wedges, which in turn load up eight anvils surrounding a press cube. Anvils of embodiments of the HPHT cell can also be used in a six anvil cubic press which is used to load an eight anvil system as shown in Appendix 1 of U.S. Provisional Application Ser. No. 61/621,918. In addition, embodiments of the HPHT cell may be used in a belt press, a piston-cylinder press or a toroidal press, which are known to those of skill in the art.

As shown in FIG. 1, the HPHT cell 100 includes gasket 1 (e.g., gaskets 11 and 13), which may include a material that has good flow properties at low pressures and demonstrates an increase in shear strength at high pressures, such as pyrophyllite or a synthetic material (e.g., a material made of earth materials, ceramics, glasses or a combination thereof) designed to possess these characteristics, such as the synthetic gasket materials described in U.S. Pat. No. 5,858,525, the entire contents of which are herein incorporated by reference. The gaskets 11 and 13 may each be formed of the same (or substantially the same) or different material. The HPHT cell 100 also includes a thermal insulation layer 3. The thermal insulation layer may include thermal insulation sleeve 31 and/or thermal insulation button 32 and 33, each of which facilitate the retention of heat in the cell 100, and more particularly in the cell working volume 6, which includes the pressure transfer medium 8 and the product being manufactured 7. The thermal insulation sleeve 31 and thermal insulation button 32 and 33 may each be formed from powders, and they may each be formed of the same (or substantially the same) or different material. The HPHT cell 100 also includes a current ring or current path 2, which may be formed of metals, graphite or other electrically conductive materials, but the disclosure is not limited thereto. In certain embodiments, the thermal insulation layer 3 (e.g., thermal insulation sleeve 31 and/or thermal insulation button 32 and 33) is separate from the current path 2. A heating element (e.g., cell heating tube 5), which may include graphite and is at least partially surrounded by the cell inner insulating layer 31 (i.e., the thermal insulation sleeve), provides heat to the cell working volume 6. The HPHT cell 100 also includes components 41, 43, 45 and 47, which form a part of the current path 2. The components 41, 43, 45 and 47 may include refractory metals such as Mo, Ta, etc., and form part of the electrical circuit in the cell. Refractory metals are also often used to encapsulate the products being pressed in the cell working volume 6 (e.g., the cell working volume). During pressurization, the gasket material 13 flows into the gaps 14. After pressurization, the gaskets will flow and extrude into the configuration shown in FIG. 1.

Heating of the cell is accomplished by allowing an electric current to flow from an anvil 12 at one end of the cell through the current path 2, including the components 41, 43 and 45, heating element 5 (e.g., a heating tube) and then via the corresponding components at the other end of the cell to the opposite anvil 12. In certain embodiments, the electric current does not flow (e.g., does not primarily flow) through the thermal insulation layer 3 (e.g., the thermal insulation sleeve 31 and/or thermal insulation button 32 and 33). For example, the first thermal insulation layer 3 and/or the gasket 1 may be electrically insulating. As used herein, the term "electrically insulating" means that an electrically insulating layer has an electrical resistance (e.g., electrical resistivity) such that the layer does not allow an electric current, sufficient to power a heating element to heat an interior volume of an HPHT cell to a temperature sufficient for HPHT pressing, to pass through such layer. For example, when the first thermal insulation layer 3 and/or the gasket 1 are electrically insulating, the first thermal insulation layer 3 and/or the gasket 1 do not conduct an electric current sufficient to power the heating element 5 to heat the interior volume 6 to a temperature sufficient for HPHT pressing, and, instead, the electric current for powering the heating element 5 is primarily conducted through a component that is separate from the first thermal insulation layer and/or the gasket 1, such as the current path 2. In some embodiments, the thermal insulation layer has an electrical resistivity of more than about 0.1 ohm·cm. The heating tube may be the highest resistance element in the cell so the largest fraction of electrical power is dissipated in this element, causing the temperature to rise above that of the other elements in the cell. The purpose of the thermal insulation layer 3 (e.g., the thermal insulation sleeve 31 and/or its corresponding thermal insulation button and disk elements 32 and 33) is to insulate the central portion of the cell and minimize heat flow out of the central portion of the cell. This makes heating the cell more energetically efficient and minimizes heat flow into the anvils 12, which can reduce their performance. The product 7 being manufactured, may be surrounded by a salt, such as NaCl, CsCl, CsBr, or CsI, which acts as a pressure transfer medium 8. After a suitable period of heating, the electric current is turned off and the cell allowed to cool down and then depressurized to recover the product.

As can be seen in FIG. 1, in certain embodiments, the thermal insulation layer 3 (e.g., the thermal insulation sleeve 31 and/or thermal insulation button 32 and 33) is separated from the anvils 12 by a material that is different from the material of the thermal insulation layer (e.g., the thermal insulation sleeve 31 and/or thermal insulation button 32 and 33). For example, the thermal insulation sleeve 31 and/or thermal insulation button 32 and 33 may be separated from the anvils by the gaskets 11 and/or 13 (e.g., gasket 1), which may include a material that has good flow properties at low pressures and demonstrates an increase in shear strength at high pressures, such as pyrophyllite or a synthetic material designed to possess these characteristics.

According to embodiments of the present disclosure, the cell inner insulating layer 31 (i.e., the thermal insulation sleeve) includes a material including CsCl, CsBr, CsI or a combination thereof. In certain embodiments, the CsBr or CsI has a CsCl crystal structure. The materials CsCl, CsBr, and CsI each have a relatively low thermal conductivity. For example, the thermal conductivity of CsCl is about 0.95 $Wm^{-1} K^{-1}$ at standard temperature and pressure, which is substantially lower than the about 2.5 $Wm^{-1} K^{-1}$ thermal conductivity of $ZrO_2$, under the same conditions. As a result, materials such as CsCl, CsBr and CsI conduct less heat than materials such as $ZrO_2$, even though CsCl, CsBr, and CsI do little to prevent or reduce the transfer of heat by way of thermal radiation. By including a material having a low thermal conductivity (e.g., lower than that of $ZrO_2$), such as CsCl, CsBr, or CsI, a thermal insulation sleeve according to embodiments of the present disclosure, such as thermal insulation sleeve 31, can reduce the amount of heat that is conducted away from the cell working volume 6, thereby increasing the temperature attained within the cell working volume 6. That is, the cell inner insulating layer 31 (i.e., thermal insulation sleeve) traps at least a portion of the heat generated by the cell heating tube 5 in the cell working volume 6, thereby increasing the temperature within the cell working volume 6 and facilitating the formation of polycrystalline ultra-hard materials or polycrystalline composites.

Although materials such as CsCl, CsBr, and CsI have low thermal conductivities, and therefore, reduce the amount of heat that is conducted away from the cell working volume 6, these materials are also virtually transparent to thermal radiation. As such, materials such as CsCl, CsBr and CsI do relatively little to reduce the amount of heat that is radiated away from the cell working volume 6. Consequently, the thermal insulation provided by the thermal insulation sleeve 31 can be greatly improved by further including an additive, such as an additive that reflects (e.g., blocks) and/or absorbs thermal radiation, such as an additive that is configured to reflect thermal radiation and/or absorb thermal radiation. For example, including certain amounts of an additive, such as electrically conductive particles, in the thermal insulation sleeve 31 may improve the cell insulation due to thermal radiation shielding provided by the additive. By further including the additive, the thermal insulation sleeve 31 may further reduce the amount of heat that is radiated (i.e., emitted) away from the cell working volume 6, thereby further increasing the temperature attained at the cell working volume 6. The additive may be included in the thermal insulation sleeve 31 by way of any suitable method of combining the additive and at least one of CsCl, CsBr or CsI. For example, the additive may be combined with at least one of CsCl, CsBr or CsI by dry powder mixing. The additive may be a liquid at high-pressure high-temperature conditions.

Suitable materials for the additive include materials that are capable of reflecting thermal radiation (i.e., materials that have good radiation blocking properties) and/or absorbing thermal radiation, include materials such as electrically conductive or semiconductive particles or electrically conductive or semiconductive powders. For example, the additive may include conductive oxide (e.g., superconductive oxides, such as, $La_{1.85}Ba_{0.15}CuO_4$, $HgBa_2Ca_2Cu_3O_x$, $Bi_2Sr_2Ca_2Cu_3O_{10}$, $YBa_2Cu_3O_7$, semi-conductors, such as Si, Ge and/or Sb, semiconductive carbides and/or nitrides (e.g., SiC, TiC and GaN). In certain embodiments, non-limiting examples of the additive include chromites, ferrites, metals, semiconductors, superconductive oxides and combinations thereof. For example, the additive may include chromite according to the formulas $LCrO_3$ or $M^I Cr_2O_4$, wherein L is yttrium or a rare earth element, and $M^I$ is a transition metal, Mg or Li. Chromite may be $LaCrO_3$, $FeCr_2O_4$, $CoCr_2O_4$, $MgCr_2O_4$ or a combination thereof, but the present disclosure is not limited thereto. Chromite may be doped with Mg, Ca, Sr or a combination thereof. Doping the chromite may improve its electrical conductivity. In some embodiments, the additive includes ferrite according to the formula $M^{II}Fe_2O_4$ or $M^{III}Fe_{12}O_{19}$, wherein $M^{II}$ is a transition metal, Mg or Li, and $M^{III}$ is Ba, Sr, or combinations thereof. Ferrite may be of $Fe_3O_4$, $CoFe_2O_4$, $ZnFe_2O_4$, $BaFe_{12}O_{19}$, $SrFe_{12}O_{19}$, $Mn_aZn_{(1-a)}Fe_2O_4$, $Ni_aZn_{(1-a)}Fe_2O_4$, or a combination thereof, wherein a is in a range of 0.01 to 0.99, but this listing is not exhaustive. In certain embodiments, the metal is a refractory metal such as Ti, V, Cr, Zr, Nb, Mo, Ru, Rh, Hf, Ta, W, Re, Os, Ir, Pt, or a combination thereof, or a metal having a relatively lower melting point, such as Bi, Sn, Pb or a combination thereof, but the present disclosure is not limited thereto. In other embodiments, non-limiting examples of the metals include Al, Fe, Mn, Ni, Co, Cu, B, Si, Be, Mg, Ca, Sr, Ba, Ga, In, Sn, Pb, Bi and combinations thereof. In certain embodiments, the additive includes electrically insulating particles. For example, the additive may include $ZrO_2$, MgO, CaO, $Al_2O_3$, $Cr_2O_3$, an aluminate (e.g., $FeAl_2O_4$) or a combination thereof.

Figure 2:
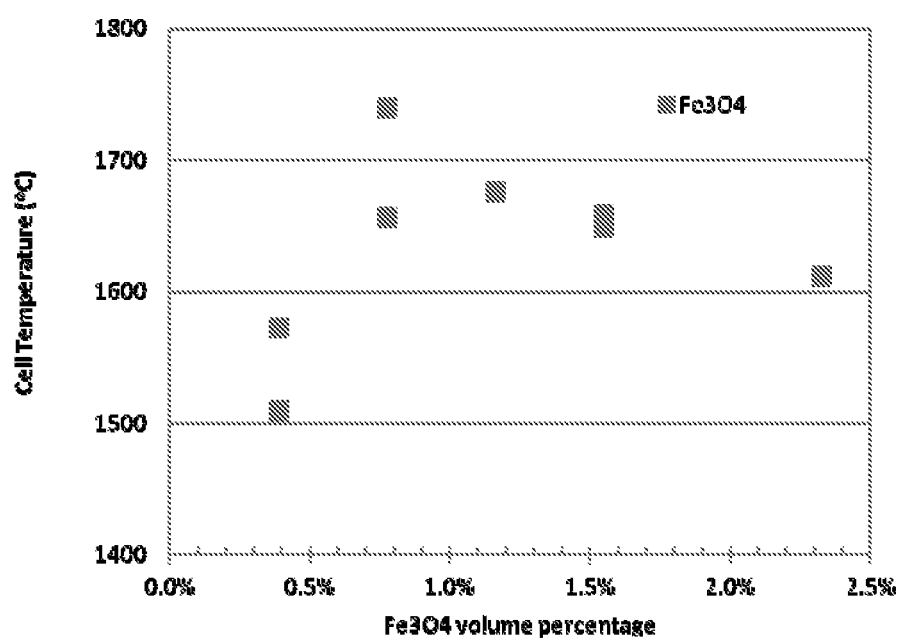
FIG. 2 is a graph of the cell temperature (° C.) achieved by heating examples of a high-pressure high-temperature cell at a fixed power level of 2100 W vs. the volume percent of an $Fe_3O_4$ additive included in each high-pressure high-temperature cell in a thermal insulation sleeve including CsCl.
Figure 3:
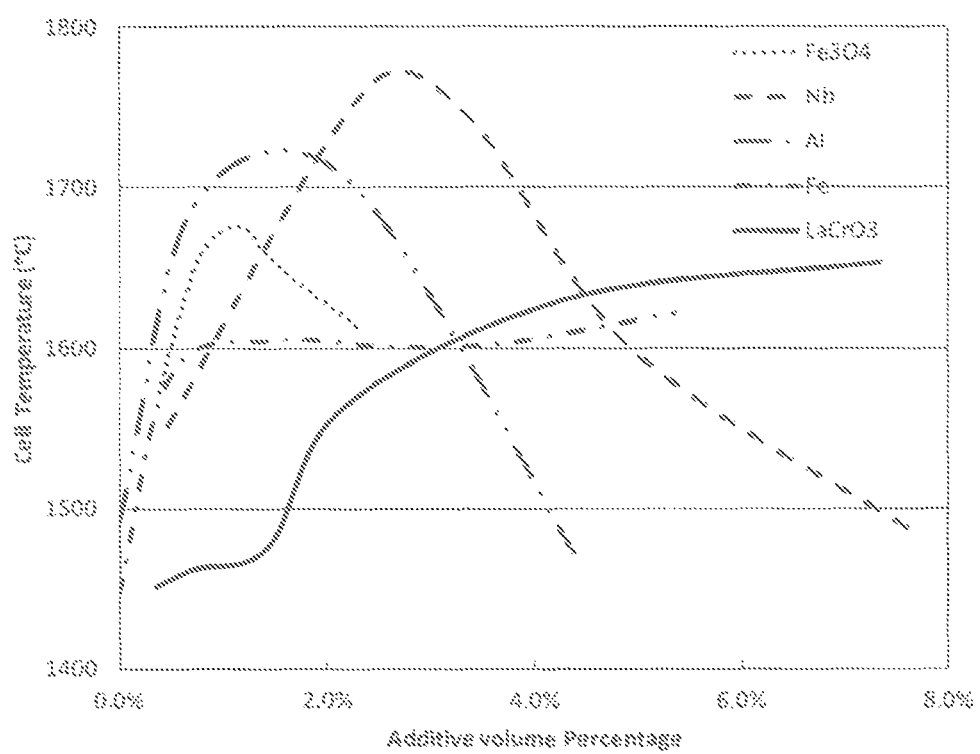
FIG. 3 is a graph of the cell temperature (° C.) achieved by heating examples of a high-pressure high-temperature cell at a power level of 2100 W vs. the volume percent of additive included in each high-pressure high-temperature cell in a thermal insulation sleeve including CsCl.
Figure 4:
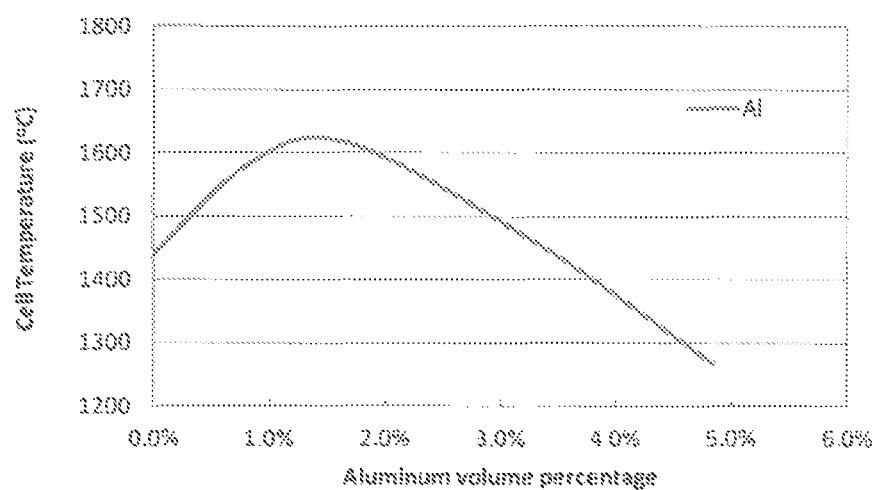
FIG. 4 is a graph of the cell temperature (° C.) achieved by heating examples of a high-pressure high-temperature cell at a power level of 2100 W vs. the volume percent of additive included in each high-pressure high-temperature cell in a thermal insulation sleeve including CsBr.

The present applicants have discovered that thermal insulation sleeves according to embodiments of the present disclosure (e.g., thermal insulation sleeves including CsCl, CsBr, or CsI and, optionally, an additive) perform substantially better than thermal insulation sleeves that primarily include $ZrO_2$. For example, FIG. 2 is a graph showing temperatures attained in the cell working volume 6 measured at the centerline of the heater tube 5, at a power level of 2100 W, for an HPHT cell including a thermal insulation sleeve 31 including CsCl mixed with varying amounts of an $Fe_3O_4$ additive. Similarly, FIGS. 3 and 4 are graphs showing temperatures attained in the cell working volume 6, at a power level of 2100 W, for an HPHT cell including a thermal insulation sleeve including CsCl mixed with varying amounts of $Fe_3O_4$, Fe, Nb, $LaCrO_3$, or Al. In each of these instances, the CsCl and the additive were combined by way of dry powder mixing. The additive, however, may be combined with CsCl, CsBr or CsI by any suitable method.

Mixing the CsCl with a small amount of an additive, such as an additive capable of reflecting and/or absorbing thermal radiation, can dramatically increase the temperature of the cell working volume 6. As can be seen in FIGS. 2 through 4, mixing CsCl with an $Fe_3O_4$, Fe, Nb, $LaCrO_3$, or Al additive can increase the temperature of the cell working volume 6 by as much as 250° C. or more. In contrast, FIGS.

2 and 3 also show that when the thermal insulation sleeve 31 did not include an additive (e.g., included CsCl without an additive), the temperature of the cell working volume 6 was about 1450 to 1500° C. Similarly, a cell including a cubic $ZrO_2$ thermal insulation sleeve also attains a cell working volume 6 temperature of about 1500° C., for the same level of power input.

FIGS. 2 through 4 also show that the temperature increase provided by the additive may abate when the additive is included in the thermal insulation sleeve in excess. Indeed, because the additive may have a thermal conductivity that is higher than that of CsCl, CsBr or CsI, including the additive in the thermal insulation sleeve in excess may raise the thermal conductivity of the thermal insulation sleeve. By raising the thermal conductivity of the thermal insulation sleeve, the additive may increase the amount of heat that can be conducted away from the cell working volume 6 by way of the thermal insulation sleeve. As can be seen in FIGS. 2 through 4, for most of the additives, the temperature increase realized in the cell working volume 6 actually diminished when the additive was included in the thermal insulation sleeve beyond a certain amount. With the exception of $LaCrO_3$, the additives studied have a thermal conductivity that is higher than that of CsCl. FIG. 3 shows that the increase in the temperature of the cell working volume 6 did not abate over the range of amounts of Fe and $LaCrO_3$ additives studied.

Including the additive in the thermal insulation sleeve reduces the amount of heat that is radiated (i.e., emitted) away from the cell working volume 6, while at the same time, if the amount of additive included in the thermal insulation sleeve exceeds a certain amount, the further addition of the additive to the thermal insulation sleeve may increase the amount of heat that is conducted away from the cell working volume 6, thereby reducing the temperature realized in the cell working volume 6. Accordingly, the amount of the additive included in the thermal insulation sleeve should be selected in view of both of the thermal conduction, thermal reflection and/or thermal absorption properties of the thermal insulation sleeve. For example, the additive may be present in the thermal insulation sleeve in an amount in a range of about 0.01 to about 50 volume percent based on the total volume of the thermal insulation sleeve. In other embodiments, the additive is present in the thermal insulation layer (e.g., the thermal insulation sleeve) in an amount of less than 5 volume percent based on the total volume of the thermal insulation layer. The amount of the additive, however, may depend upon the composition of the additive. For example, when the additive includes a conductive material such as Ni, Fe, Cr, Mo, Ta, or mixtures thereof, the additive may be present in an amount of less than 5 volume percent based on the total volume of the thermal insulation layer. When the additive includes $Fe_3O_4$, the additive may be present in an amount in a range of about 0.01 to about 2.0 volume percent. When the additive includes Nb, the additive may be present in an amount in a range of about 0.01 to about 4.0 volume percent, or about 2.0 to about 4.0 volume percent. When the additive includes Al, the additive may be present in an amount in a range of about 0.01 to about 3.0 volume percent. The thermal insulation sleeve according to embodiments of the present disclosure may be included in any suitable HPHT press system.

Embodiments of the present disclosure are also directed to a thermal insulation layer, such as a thermal insulation button, for example thermal insulation button 32 and 33, for use in a high-pressure high-temperature press, the thermal insulation button 32 and 33 including a material including CsCl, CsBr, CsI or a combination thereof.

As described above, the thermal conductivity of CsCl is about 0.95 $Wm^{-1} K^{-1}$ at standard temperature and pressure, which is substantially lower than the about 2.5 $Wm^{-1} K^{-1}$ thermal conductivity of $ZrO_2$, under the same conditions. As a result, materials such as CsCl, CsBr and CsI conduct less heat than materials such as $ZrO_2$, even though CsCl, CsBr, and CsI do little to prevent or reduce the transfer of heat by way of thermal radiation. By including a material having a low thermal conductivity (e.g., lower than that of $ZrO_2$), such as CsCl, a thermal insulation button according to embodiments of the present disclosure, such as thermal insulation button 32 and 33, can reduce the amount of heat that is conducted away from the cell working volume 6, thereby increasing the temperature attained within the cell working volume 6. That is, the thermal insulation button 32 and 33 traps at least a portion of the heat generated by the cell heating tube 5 in the cell working volume 6, thereby increasing the temperature within the cell working volume 6 and facilitating the formation of ultra-hard materials or polycrystalline composites.

As described above, although CsCl has a low thermal conductivity, and therefore, reduces the amount of heat that is conducted away from the cell working volume 6, CsCl is also virtually transparent to thermal radiation. As such, CsCl does relatively little to reduce the amount of heat that is radiated away from the cell working volume 6. Consequently, the thermal insulation provided by the thermal insulation button can be greatly improved by further including an additive, such as an additive that reflects (e.g., blocks) and/or absorbs thermal radiation, such as an additive that is configured to reflect thermal radiation and/or absorb thermal radiation. For example, including certain amounts of an additive, such as electrically conductive particles, in the thermal insulation button may improve the cell insulation due to thermal radiation shielding provided by the additive. By further including the additive, the thermal insulation button may further reduce the amount of heat that is radiated (i.e., emitted) away from the cell working volume 6, thereby further increasing the temperature attained at the cell working volume 6. The additive may be included in the thermal insulation button by way of any suitable method of combining the additive and at least one of CsCl, CsBr or CsI. For example, the additive may be combined with at least one of CsCl, CsBr or CsI by dry powder mixing. The additive may be a liquid at high-pressure high-temperature conditions.

Suitable materials for the additive include materials that are capable of reflecting thermal radiation (i.e., materials that have good radiation blocking properties) and/or absorbing thermal radiation, include materials such as electrically conductive or semiconductive particles or electrically conductive or semiconductive powders. For example, the additive may include conductive oxide (e.g., superconductive oxides, such as, $La_{1.85}Ba_{0.15}CuO_4$, $HgBa_2Ca_2Cu_3O_x$, $Bi_2Sr_2Ca_2Cu_3O_{10}$, $YBa_2Cu_3O_7$, semi-conductors, such as Si, Ge and/or Sb, semiconductive carbides and/or nitrides (e.g., SiC, TiC and GaN). In certain embodiments, non-limiting examples of the additive include chromites, ferrites, metals, semiconductors, superconductive oxides and combinations thereof. For example, the additive may include chromite according to the formulas $LCrO_3$ or $M^tCr_2O_4$, wherein L is yttrium or a rare earth element, and $M^t$ is a transition metal, Mg or Li. Chromite may be $LaCrO_3$, $FeCr_2O_4$, $CoCr_2O_4$, $MgCr_2O_4$ or a combination thereof, but the present disclosure is not limited thereto. Chromite may be doped with Mg, Ca, Sr or combinations thereof. Doping the chromite may improve its electrical conductivity. In some embodiments, the additive includes ferrite according to the formula $M^{II}Fe_2O_4$ or $M^{III}Fe_{12}O_{19}$, wherein $M^{II}$ is a transition metal, Mg or Li, and $M^{III}$ is Ba, Sr, or combinations thereof. Ferrite may be of $Fe_3O_4$, $CoFe_2O_4$, $ZnFe_2O_4$, $BaFe_{12}O_{19}$, $SrFe_{12}O_{19}$, $Mn_aZn_{(1-a)}Fe_2O_4$, $Ni_aZn_{(1-a)}Fe_2O_4$, or a combination thereof, wherein a is in a range of 0.01 to 0.99, but this listing is not exhaustive. In certain embodiments, the metal is a refractory metal such as Ti, V, Cr, Zr, Nb, Mo, Ru, Rh, Hf, Ta, W, Re, Os, Ir, Pt, or a combination thereof, or a metal having a relatively lower melting point, such as Bi, Sn, Pb or a combination thereof, but the present disclosure is not limited thereto. In other embodiments, non-limiting examples of the metal Al, Fe, Mn, Ni, Co, Cu, B, Si, Be, Mg, Ca, Sr, Ba, Ga, In, Sn, Pb, Bi and combinations thereof. In certain embodiments, the additive includes electrically insulating particles. For example, the additive may include $ZrO_2$, MgO, CaO, $Al_2O_3$, $Cr_2O_3$, an aluminate (e.g., $FeAl_2O_4$) or a combination thereof.

The present applicants have discovered that thermal insulation buttons according to embodiments of the present disclosure (e.g., thermal insulation buttons including CsCl, CsBr, or CsI and, optionally, an additive) perform substantially better than thermal insulation buttons that primarily include $ZrO_2$. The thermal insulation properties of the thermal insulation button are similar to those described above with respect to the thermal insulation sleeve. Mixing the CsCl with a small amount of an additive, such as an additive capable of reflecting and/or absorbing thermal radiation, can dramatically increase the temperature of the cell working volume 6. However, the temperature increase provided by the additive may abate when the additive is included in the thermal insulation button in excess. Indeed, because the additive may have a thermal conductivity that is higher than that of CsCl, CsBr or CsI, including the additive in the thermal insulation button in excess may raise the thermal conductivity of the thermal insulation button. By raising the thermal conductivity of the thermal insulation button, the additive may increase the amount of heat that can be conducted away from the cell working volume 6 by way of the thermal insulation button.

Including the additive in the thermal insulation button reduces the amount of heat that is radiated (i.e., emitted) away from the cell working volume 6, while at the same time, if the amount of additive included in the thermal insulation button exceeds a certain amount, the further addition of the additive to the thermal insulation button may increase the amount of heat that is conducted away from the cell working volume 6, thereby reducing the temperature realized in the cell working volume 6. Accordingly, the amount of the additive included in the thermal insulation button should be selected in view of both of the thermal conduction, thermal reflection, and/or thermal absorption properties of the thermal insulation button. For example, the additive may be present in the thermal insulation button in an amount in a range of about 0.01 to about 50 volume percent based on the total volume of the thermal insulation button. In other embodiments, the additive is present in the thermal insulation layer (e.g., the thermal insulation button) in an amount of less than 5 volume percent based on the total volume of the thermal insulation layer. The amount of the additive, however, may depend upon the composition of the additive. For example, when the additive includes a conductive material such as Ni, Fe, Cr, Mo, Ta, or mixtures thereof, the additive may be present in an amount of less than 5 volume percent based on the total volume of the thermal insulation layer. When the additive includes $Fe_3O_4$, the additive may be present in an amount in a range of about 0.01 to about 2.0 volume percent. When the additive includes Nb, the additive may be present in an amount in a range of about 0.01 to about 4.0 volume percent, or about 2.0 to about 4.0 volume percent. When the additive includes Al, the additive may be present in an amount in a range of about 0.01 to about 3.0 volume percent. The thermal insulation button according to embodiments of the present disclosure may be included in any suitable HPHT press system.

Another embodiment of the present disclosure is directed to a pressure transfer medium for use in a high-pressure high-temperature press, the pressure transfer medium including CsBr or CsI. The pressure transfer medium 8, which is located in the cell working volume 6, is used to transfer pressure from the anvils 12, or other similar components, of the HPHT press to the material to be pressed (e.g., the green compact). Sodium chloride (NaCl) is widely used as a pressure transfer medium in HPHT cells for conventional PCD and PCBN sintering, as it is inexpensive and readily available. However, NaCl begins to melt when the temperature is above 1600° C. at a pressure of 8 GPa. As such, the application of NaCl as a pressure transfer medium is limited when the temperature exceeds 1600° C.

Figure 5:
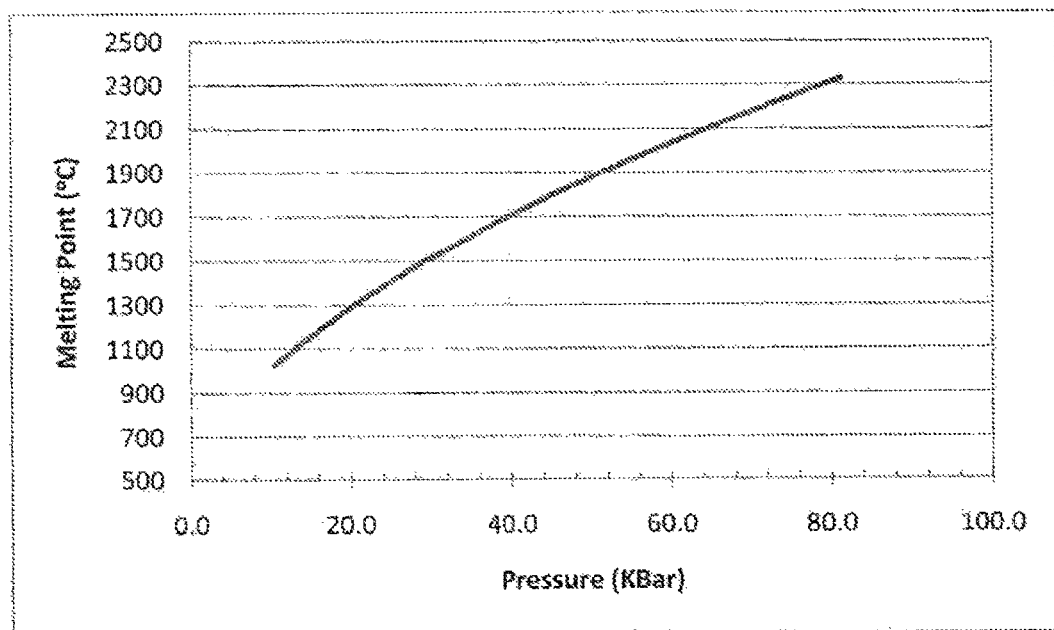
FIG. 5 is a graph of the melting point (° C.) of CsCl vs. the applied pressure (kbar).

The present applicants have discovered, however, that the CsBr and CsI have melting points above 2000° C. at a pressure of 8 GPa. Although CsBr and CsI have relatively low melting temperatures at ambient pressure, their melting temperatures increase sharply as the pressure increases. For example, the melting temperature of CsCl is also relatively low at ambient pressure, but increases sharply with an increase in pressure as shown in FIG. 5. The melting point of CsBr is higher than that of CsI, and the melting point of CsCl is higher than the melting points of CsI and CsBr. Among these materials, CsCl tends to perform better as an insulation material than either CsI or CsBr.

Furthermore, the present applicants have discovered that CsBr and CsI have compressibilities that are similar to that of NaCl. As such, CsBr and CsI suitably transfer pressure from the anvils 12, or other similar components, of an HPHT press to the material to be pressed (e.g., the green compact). Additionally, as discussed above, both CsBr and CsI also have low thermal conductivity, and therefore, can reduce the amount of heat that is conducted away from the cell working volume 6. That is, materials such as CsBr and CsI conduct less heat than other materials such as NaCl, even though CsBr and CsI do little to prevent or reduce the transfer of heat by way of thermal radiation. As a result, the pressure transfer medium 8 traps at least a portion of the heat generated by the cell heating tube 5 in the cell working volume 6, thereby increasing the temperature within the cell working volume 6 and facilitating the formation of ultrahard materials or polycrystalline composites.

As described above, although CsBr and CsI have low thermal conductivities, and therefore, reduce the amount of heat that is conducted away from the cell working volume 6, CsBr and CsI are also virtually transparent to thermal radiation. As such, CsBr and CsI do relatively little to reduce the amount of heat that is radiated away from the cell working volume 6. Consequently, the thermal insulation provided by the pressure transfer medium 8 can be greatly improved by further including an additive, such as an additive that reflects (e.g., blocks) and/or absorbs thermal radiation, such as an additive that is configured to reflect thermal radiation and/or absorb thermal radiation. For example, including certain amounts of an additive, such as electrically conductive particles, in the pressure transfer medium 8 may improve the cell insulation due to thermal radiation shielding provided by the additive. By further including the additive, the pressure transfer medium 8 may further reduce the amount of heat that is radiated (i.e., emitted) away from the cell working volume 6, thereby further increasing the temperature attained at the cell working volume 6. The additive may be included in the pressure transfer medium 8 by way of any suitable method of combining the additive and CsBr or CsI. For example, the additive may be combined with CsBr or CsI by dry powder mixing. The additive may be a liquid at high-pressure high-temperature conditions.

Suitable materials for the additive include materials that are capable of reflecting thermal radiation (i.e., materials that have good radiation blocking properties) and/or absorbing thermal radiation, include materials such as electrically conductive or semiconductive particles or electrically conductive or semiconductive powders. For example, the additive may include conductive oxide (e.g., superconductive oxides, such as, $La_{1.85}Ba_{0.15}CuO_4$, $HgBa_2Ca_2Cu_3O_x$, $Bi_2Sr_2Ca_2Cu_3O_{10}$, $YBa_2Cu_3O_7$, semi-conductors, such as Si, Ge and/or Sb, semiconductive carbides and/or nitrides (e.g., SiC, TiC and GaN). In certain embodiments, non-limiting examples of the additive include chromites, ferrites, metals, semiconductors, superconductive oxides and combinations thereof. For example, the additive may include chromite according to the formulas $LCrO_3$ or $M^{I}Cr_2O_4$, wherein L is yttrium or a rare earth element, and $M^{I}$ is a transition metal, Mg or Li. Chromite may be $LaCrO_3$, $FeCr_2O_4$, $CoCr_2O_4$, $MgCr_2O_4$ or a combination thereof, but the present disclosure is not limited thereto. Chromite may be doped with Mg, Ca, Sr or combinations thereof. Doping the chromite may improve its electrical conductivity. In some embodiments, the additive includes ferrite according to the formula $M^{II}Fe_2O_4$ or $M^{III}Fe_{12}O_{19}$, wherein $M^{II}$ is a transition metal, Mg, or Li, and $M^{III}$ is Ba, Sr, or combinations thereof. Ferrite may be $Fe_3O_4$, $CoFe_2O_4$, $ZnFe_2O_4$, $BaFe_{12}O_{19}$, $SrFe_{12}O_{19}$, $Mn_aZn_{(1-a)}Fe_2O_4$, $Ni_aZn_{(1-a)}Fe_2O_4$, or a combination thereof, wherein a is in a range of 0.01 to 0.99, but this listing is not exhaustive. In certain embodiments, the metal is a refractory metal such as Ti, V, Cr, Zr, Nb, Mo, Ru, Rh, Hf, Ta, W, Re, Os, Ir, Pt, or a combination thereof, or a metal having a relatively lower melting point, such as Bi, Sn, Pb or a combination thereof but the present disclosure is not limited thereto. In other embodiments, non-limiting examples of the metals include Al, Fe, Mn, Ni, Co, Cu, B, Si, Be, Mg, Ca, Sr, Ba, Ga, In, Sn, Pb, Bi and combinations thereof. In certain embodiments, the additive includes electrically insulating particles. For example, the additive may include $ZrO_2$, MgO, CaO, $Al_2O_3$, $Cr_2O_3$, an aluminate (e.g., $FeAl_2O_4$) or a combination thereof.

The thermal insulation properties of the pressure transfer medium 8 are similar to those described above with respect to the thermal insulation sleeve and FIGS. 2 through 4. Mixing the CsBr or CsI with a small amount of an additive, such as an additive capable of reflecting and/or absorbing thermal radiation, can dramatically increase the temperature of the cell working volume 6. However, the temperature increase provided by the additive may abate when the additive is included in the pressure transfer medium 8 in excess. Indeed, because the additive may have a thermal conductivity that is higher than that of CsBr or CsI, including the additive in the pressure transfer medium 8 in excess may raise the thermal conductivity of the pressure transfer medium. By raising the thermal conductivity of the pressure transfer medium 8, the additive may increase the amount of heat that can be conducted away from the cell working volume 6 by way of the pressure transfer medium.

Including the additive in the pressure transfer medium 8 reduces the amount of heat that is radiated (i.e., emitted) away from the cell working volume 6, while at the same time, if the amount of additive included in the pressure transfer medium 8 exceeds a certain amount, the further addition of the additive to the pressure transfer medium 8 may increase the amount of heat that is conducted away from the cell working volume 6, thereby reducing the temperature realized in the cell working volume 6. Accordingly, the amount of the additive included in the pressure transfer medium 8 should be selected in view of both of the thermal conduction, thermal reflection, and/or thermal absorption properties of the pressure transfer medium. For example, the additive may be present in the pressure transfer medium 8 in an amount in a range of about 0.01 to about 50 volume percent based on the total volume of the pressure transfer medium. In other embodiments, the additive is present in the pressure transfer medium in an amount of less than 5 volume percent based on the total volume of the pressure transfer medium. The amount of the additive, however, may depend upon the composition of the additive. For example, when the additive includes a conductive material such as Ni, Fe, Cr, Mo, Ta, or mixtures thereof, the additive may be present in an amount of less than 5 volume percent based on the total volume of the thermal insulation layer. When the additive includes $Fe_3O_4$, the additive may be present in an amount in a range of about 0.01 to about 2.0 volume percent. When the additive includes Nb, the additive may be present in an amount in a range of about 0.01 to about 4.0 volume percent, or about 2.0 to about 4.0 volume percent. When the additive includes Al, the additive may be present in an amount in a range of about 0.01 to about 3.0 volume percent. Embodiments of the present disclosure are directed to a pressure transfer medium for use in a high-pressure high-temperature press, the pressure transfer medium including CsCl and an additive, with the proviso that the additive does not include $ZrO_2$. The additive may be any of those described above, provided that the additive is not $ZrO_2$. The pressure transfer medium according to embodiments of the present disclosure may be included in any suitable HPHT press system.

Although only a few example embodiments have been described in detail above, those skilled in the art will readily appreciate that many modifications are possible in the example embodiments without materially departing from this disclosure. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112, paragraph 6 for any limitations of any of the claims herein, except for those in which the claim expressly uses the words "means for" together with an associated function.

What is claimed is:

1. A high-pressure high-temperature press system, the high-pressure high-temperature press system comprising:
   a at least one anvil;
   a heating element;
   a current path for electrically connecting the at least one anvil and the heating element; and an insulation layer at least partly surrounding the heating element, the insulation layer being thermally insulating and electrically insulating, and the insulation layer comprising a material selected from the group consisting of cesium chloride (CsCl), cesium bromide (CsBr), cesium iodide (CsI) and combinations thereof.

2. The high-pressure high-temperature press system of claim 1, wherein the insulation layer is separated from the anvil by a material that is different from the material of the insulation layer.

3. The high-pressure high-temperature press system of claim 1, wherein the insulation layer is separate from the current path.

4. The high-pressure high-temperature press system of claim 1, wherein the insulation layer has an electrical resistivity of greater than about 0.1 ohm·cm.

5. The high-pressure high-temperature press system of claim 1, wherein the insulation layer further comprises an additive comprising electrically conductive or semiconductive particles, wherein the insulation layer is an electrically insulating layer having an electrical resistivity of greater than 0.1 ohm·cm.

6. The high-pressure high-temperature press system of claim 5, wherein the additive comprises a material selected from the group consisting of chromites, ferrites, metals, semiconductors, superconductive oxides and combinations thereof.

7. The high-pressure high-temperature press system of claim 6, wherein the additive comprises chromite according to the formulas $LCrO_3$ or $M^I Cr_2O_4$, wherein L is yttrium or a rare earth element, and $M^I$ is a transition metal, Mg or Li.

8. The high-pressure high-temperature press system of claim 6, wherein chromite is selected from the group consisting of $LaCrO_3$, $FeCr_2O_4$, $CoCr_2O_4$, $MgCr_2O_4$ and combinations thereof.

9. The high-pressure high-temperature press system of claim 8, wherein the chromite is doped with Mg, Ca, Sr, or a combination thereof.

10. The insulation layer of claim 6, wherein the additive comprises ferrite according to the formula $M^{II}Fe_2O_4$ or $M^{III}Fe_{12}O_{19}$, wherein $M^{II}$ is a transition metal, Mg, or Li, and $M^{III}$ is Ba, Sr, or a combination thereof.

11. The insulation layer of claim 6, wherein ferrite is selected from the group consisting of $Fe_3O_4$, $CoFe_2O_4$, $ZnFe_2O_4$, $BaFe_{12}O_{19}$, $SrFe_{12}O_{19}$, $Mn_aZn_{(1-a)}Fe_2O_4$, $Ni_aZn_{(1-a)}Fe_2O_4$, and combinations thereof, wherein a is in a range of 0.01 to 0.99.

12. The insulation layer of claim 6, wherein the metal is a refractory metal selected from the group consisting of Ti, V, Cr, Zr, Nb, Mo, Ru, Rh, Hf, Ta, W, Re, Os, Ir, Pt, and combinations thereof.

13. The insulation layer of claim 6, wherein the metal is selected from the group consisting of Al, Fe, Mn, Ni, Co, Cu, B, Si, Be, Mg, Ca, Sr, Ba, Ga, In, Sn, Pb, Bi and combinations thereof.

14. The high-pressure high-temperature press system of claim 5, wherein the additive is present in the insulation layer in an amount in a range of about 0.1 to about 50 volume percent based on the total volume of the insulation layer.

15. The high-pressure high-temperature press system of claim 5, wherein the additive is present in the insulation layer in an amount of less than 5 volume percent based on the total volume of the insulation layer.

16. The high-pressure high-temperature press system of claim 5, wherein the insulation layer forms a sleeve surrounding the heating element.

17. The high-pressure high-temperature press system of claim 5, wherein the insulation layer comprises a thermal insulation button.

18. The high-pressure high-temperature press system of claim 5, wherein the insulation layer at least partially surrounds a working volume of a high-pressure high-temperature press cell.

19. The high-pressure high-temperature press system of claim 1, wherein the insulation layer forms a sleeve surrounding the heating element.

* * * * *